(12) United States Patent
Hahnenberg et al.

(10) Patent No.: US 10,766,428 B2
(45) Date of Patent: Sep. 8, 2020

(54) RAIL SYSTEM FOR ROOF RACK FASTENING

(71) Applicant: FORD GLOBAL TECHNOLOGIES, LLC, Dearborn, MI (US)

(72) Inventors: Daniel Hahnenberg, Zulpich (DE); Michael Otte, Duisburg (DE); Thomas Benderoth, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/240,381

(22) Filed: Jan. 4, 2019

(65) Prior Publication Data

US 2019/0210540 A1 Jul. 11, 2019

(30) Foreign Application Priority Data

Jan. 5, 2018 (DE) .................... 10 2018 200 115

(51) Int. Cl.
*B60R 9/058* (2006.01)
(52) U.S. Cl.
CPC .................... *B60R 9/058* (2013.01)
(58) Field of Classification Search
CPC .................. B60R 9/058; B60R 9/04
USPC .................. 224/309, 326; 296/210
See application file for complete search history.

(56) References Cited

U.S. PATENT DOCUMENTS

| | | | | |
|---|---|---|---|---|
| 3,473,773 A * | 10/1969 | Meyer | ............. | B60R 9/058 248/222.41 |
| 4,858,803 A * | 8/1989 | Gerber | ............. | B60R 9/048 224/329 |
| 4,911,348 A * | 3/1990 | Rasor | ............. | B60R 9/045 224/321 |
| 5,575,527 A * | 11/1996 | Pfister | ............. | B60R 13/0206 296/210 |
| 5,624,266 A * | 4/1997 | Gibbs | ............. | B60Q 1/302 224/315 |
| 5,782,392 A | 7/1998 | Yamamoto | | |
| 6,158,637 A * | 12/2000 | Fisch | ............. | B60R 9/04 224/309 |
| 7,798,565 B2 * | 9/2010 | Johl | ............. | B60R 13/0206 296/210 |

(Continued)

FOREIGN PATENT DOCUMENTS

| | | |
|---|---|---|
| AT | 171229 B | 5/1952 |
| DE | 10353687 A1 | 6/2005 |

(Continued)

OTHER PUBLICATIONS

English Machine Translation of AT17122913 dated May 10, 1952.

(Continued)

*Primary Examiner* — Justin M Larson
(74) *Attorney, Agent, or Firm* — David Coppiellie; King & Schickli, PLLC

(57) ABSTRACT

A fastening rail for a vehicle roof serves for the assembly of a roof rack. The fastening rail includes an assembly region for the assembly of the roof rack and fastening regions for fastening the fastening rail to the vehicle roof. The fastening regions include rear engagement means configured integrally with the fastening rail, that serve for securing the fastening rail to the vehicle roof by means of a bayonet-type displacement movement.

11 Claims, 2 Drawing Sheets

(56) References Cited

U.S. PATENT DOCUMENTS

| | | | | |
|---|---|---|---|---|
| 8,496,147 B2* | 7/2013 | Binder | ...................... | B60R 9/04 |
| | | | | 224/309 |
| 8,720,761 B2* | 5/2014 | Binder | ...................... | B60R 9/04 |
| | | | | 224/557 |
| 9,393,911 B2* | 7/2016 | Pfeiffer | .................. | B60R 9/058 |
| 9,738,229 B2* | 8/2017 | Sato | ........................ | B60R 9/045 |
| 2015/0122857 A1* | 5/2015 | Ferman | .................. | B60R 9/058 |
| | | | | 224/309 |
| 2019/0210540 A1* | 7/2019 | Hahnenberg | ............ | B60R 9/058 |

FOREIGN PATENT DOCUMENTS

| | | | |
|---|---|---|---|
| EP | 2942237 | A1 | 11/2015 |
| FR | 2993219 | A1 | 1/2014 |
| FR | 3017087 | A1 | 8/2015 |

OTHER PUBLICATIONS

English Machine Translation of DE10353687A1 dated Jun. 30, 2005.
English Machine Translation of EP2942237A1 dated Nov. 11, 2015.
English Machine Translation of FR2993219A1 dated Jan. 17, 2014.
English Machine Translation of FR3017087A1 dated Aug. 7, 2015.

* cited by examiner

RAIL SYSTEM FOR ROOF RACK FASTENING

TECHNICAL FIELD

This document relates to a fastening rail for a vehicle roof, which serves for the assembly of a roof rack and which comprises an assembly region for the assembly of a roof rack and fastening regions for fastening the fastening rail to a vehicle roof. This document also relates to a roof arrangement, a vehicle and a method for fastening a fastening rail.

BACKGROUND

Roof racks for vehicles have enjoyed continued popularity for many decades. Roof racks are well suited for the transport of bulky objects, in particular when the use of a trailer is not required or not desired. This is due, for example, to the lower purchase costs of a roof rack (relative to trailers), the reduced space requirement and reduced operating restrictions (no strict mandatory speed limit or the like). An example of the use of roof racks which is seen very frequently is for the transport of skis or other winter sports equipment.

In order to keep the air resistance of the vehicle as low as possible, in particular also for reasons of the energy efficiency thereof, roof racks are generally designed to be able to be assembled/dismantled in a reversible manner, since during most of the time when the vehicle is used they are not required and thus weight and air resistance may be reduced. In order to be able to assemble roof racks, a suitable assembly structure has to be accordingly provided on the roof of a vehicle. In this case, a structure is to be provided, said structure being able to receive sufficiently large loads, being relatively advantageous in terms of production and assembly, being suitable for the assembly of the largest possible number of roof racks (if possible substantially irrespective of the manufacturer) and, in particular in "normal operation" without a roof rack, having an air resistance which is as low as possible. In particular, in order to ensure the ability to assemble the largest possible number of different types of roof racks, the fastening rails for roof racks which are known per se and have been used and proved effective over many years are still the preferred technical means for the assembly of roof racks.

However, there is still the need for improvement with regard to the fastening of the fastening rail to the vehicle itself (more specifically: in the region of the vehicle roof). Here attempts are still being made to fulfil a range of partially conflicting interests in a manner which is as advantageous as possible, such as for example load-bearing capacity values which are as high as possible, capacity for easy assembly, replaceability of the fastening rail in the case of damage, cost-effective production, etc. Since in this respect there was always the need for optimization, over the years a plurality of proposed solutions have been made.

For example, in U.S. Pat. No. 5,782,392 it is proposed to provide a vehicle roof with longitudinal grooves which extend in the direction of the vehicle longitudinal axis. A corresponding protruding bulged region of a roof rack fastening device may be inserted by its cross section into the longitudinal grooves, resulting in a substantially flush surface of the vehicle roof. The bulged region is screwed onto the roof structure by means of fastening screws. A rail body which has a cross section extends from the fastening bulge so that a roof rack may be fastened thereto by fastening clips. Although the fastening rails described therein have advantageous air resistance properties and an advantageous appearance, the fastening of the fastening rail to the vehicle roof is relatively complex. A further drawback is that the vehicle roof is relatively complex to design, due to the required groove, in order to be suitable for the system proposed therein.

A further proposal has been made by FR 3017087 B 1. In this case a fastening rail extending in the vehicle longitudinal axis is also fastened by a plurality of fastening screws to a vehicle roof. In this case, the assembly of the fastening rail is also relatively complex.

A further proposal is disclosed in FR 2993219 A1 in which it is also proposed to fasten a fastening rail for roof racks extending in the longitudinal direction of the motor vehicle roof by means of a plurality of fastening screws to the vehicle roof. In this case the assembly is also relatively complex.

Whilst the known fastening rails and/or the assembly thereof on a vehicle roof generally fulfill the assigned functions to a sufficient extent, there is still further room for improvement.

SUMMARY

The object of this document is to improve a fastening rail for a vehicle roof which serves for the assembly of a roof rack and which comprises an assembly region for the assembly of a roof rack and fastening regions for fastening the fastening rail to a vehicle roof. That fastening rail has improved properties relative to such fastening rails known from the prior art. A further object is to propose a method for fastening a fastening rail to a vehicle roof which has improved properties relative to such methods known from the prior art.

The object is achieved by a fastening rail having the features set forth in the following claims. It should be mentioned that the features and measures disclosed individually in the following description may be combined together in any technically expedient manner and disclose further embodiments of the fastening rail. The description additionally characterizes and specifies the fastening rail, in particular, in connection with the figures.

To this end, it is proposed to develop a fastening rail for a vehicle roof which serves for the assembly of a roof rack and which comprises an assembly region for the assembly of a roof rack and fastening regions for fastening the fastening rail to a vehicle roof. The fastening regions comprise a rear connector configured integrally with the fastening rail for securing the fastening rail to the vehicle roof by means of a bayonet-type displacement movement. As a result of the design, by means of a simple bayonet closure-type fastening, a rapid, intuitive and accurate assembly may be achieved due to the rear connector. In particular, at the same time particularly large fastening forces may be produced in a simple manner in one and/or in several preferred directions. Since, in principle, by simple handling it is possible to fix the fastening rail to the vehicle roof, at least to prefix the fastening rail, the assembly is able to be carried out in a particularly rapid and uncomplicated manner. Even if further fastening steps and/or locking steps (as will be described in more detail hereinafter) were to be required, by the proposed design prefixing may be carried out so that the fastening rail automatically remains in a suitable assembly position, so that subsequent assembly steps may be carried out particularly easily and even by few people (optionally by just one person) in a simple and rapid manner. This may be advantageous not only during the initial assembly of the vehicle but, in particular, also at subsequent times when, for example, a repair or a replacement of the fastening rail is required. The required displacement movement in this case does not necessarily have to be the same for all regions of the fastening rail. Even if the fastening rail has to be rotated "in the manner of a propeller", for example, it is possible to refer locally to a displacement movement, at least to a good approximation, in the area of the individual fastening regions. It is expedient if at least one, at least two, at least a plurality or (substantially) all of the fastening regions are provided with a rear connector. In principle, it generally applies here that a higher number of rear connector to a certain extent makes the assembly more difficult but larger load-bearing forces and/or larger (pre)fixing forces may be produced. On the other hand, optionally the (pre)assembly may be accelerated by a lower number of rear connectors; this is in combination with fastening forces which are generally still sufficient. The actual number of fastening regions provided with rear connectors may be selected according to the desired layout criteria.

It is generally advantageous if the rear connectors face or open in substantially the same direction and/or are oriented substantially parallel to the longitudinal axis of the fastening rail. In such a case, generally a particularly simple (pre) assembly may be implemented with at the same time high load-bearing values of the arrangement.

It is also expedient if a lock is provided for the fastening regions and/or the rear connector, said lock being configured, in particular, as positive locking means and/or as non-positive locking means and/or as locking means by a material connection. As a result, the (pre)fixing implemented by the rear connector may be generally significantly improved, so that the load-bearing values of the final arrangement in turn may be significantly higher. In particular, it is also possible that due to the lock a loosening displacement movement which opposes the original displacement movement serving for fastening the fastening rail onto the vehicle roof may be prevented from being produced. In principle, the lock provided may be of any type. In particular, positive locking means, non-positive locking means or locking means by a material-connection are suitable, but also a combination of two or all of these locking means. In this case, the lock may be provided in each fastening region and/or on each rear connector. It is possible, however, that this is implemented in only a portion of the fastening regions/the rear connectors, in an extreme case only in a single fastening region/a single rear connector. It is also possible that the type of lock from fastening region to fastening region (rear connector to rear connector) is altered, so that for example, in one fastening region, a positive lock is provided, whereas in a different fastening region, a non-positive lock is provided.

Moreover, it may prove advantageous if the lock comprises screw-like devices or are substantially configured as such. As a result, by using a standard assembly step and/or by using standard tools (screwdriver/pneumatic screwdriver and the like) with comparatively small assembly forces, a particularly large fastening force may be produced. This is generally expedient. It should be mentioned that such screw-like devices may not only prove advantageous in connection with non-positive locking means but also in another connection, such as in particular also in connection with positive locking means.

It may also be advantageous if the rear connector is configured to be substantially hook-like. In particular, in this case it is possible to conceive of an angular hook. In other words, a part of the hook-like rear connector protrudes substantially vertically from the lower face of the fastening rail/from the lower face of a fastening region (as a type of support pillar). The actual rear engagement surface (i.e. the actual rear engagement plate or the actual rear engagement region or the actual rear engaging region) in turn may expediently be arranged substantially parallel to the longitudinal axis of the fastening region (viewed locally, since fastening rails often have a certain curvature) and/or parallel to the bearing surface of a fastening means, wherein the bearing surface of the rear engagement surface may come into contact with a surface of the roof structure (roof plate/roof panel/structural element of the roof structure) of the vehicle. Optionally, it may prove advantageous if a slight bevel is provided so that a type of self-locking oblique plane/a type of self-locking wedge is produced so that to a certain extent a type of conical clamping force may be produced. This generally leads to the actual rear engagement surface of the hook-like rear connector being able to be arranged substantially at right angles to the surface normal of the fastening rail in the region of the relevant fastening region.

The object is also achieved by a roof arrangement of a vehicle which has a roof structure and at least one fastening rail according to the above-described design is proposed. The fastening rail in this case is fastened (at least) by means of the rear connector to the roof structure. The roof structure may be substantially any type of roof structure of a vehicle known from the prior art. In particular, the fastening of the fastening rail may be fastened in the region of the self-supporting elements of a roof structure. As a result, particularly high load-bearing values may be produced. Moreover, the advantages and properties already described with reference to the fastening rail are also produced in a similar manner for the proposed roof arrangement. A development within the meaning of the above description is also possible in an at least similar manner.

In particular, the proposed roof arrangement may be developed by insertion openings or receivers being provided in the roof structure for inserting the rear connector of the fastening rail and/or by locking openings being provided for producing, in particular, a positive locking of the fastening rail to the roof structure. With such a design of the roof structure, it is possible, in particular, to be able to carry out the assembly of the fastening rail to the roof structure in a particularly simple and intuitive manner. The size of the receiver in this case is generally selected to be slighter larger than the size of the rear connector (in particular the rear engagement regions of the rear connector). In this manner, a simple assembly may be carried out, paired with optionally large (preliminary) retaining forces, so that at least a preassembly is possible, a particularly simple and uncomplicated final assembly (for example by introducing a lock) being able to be implemented thereby.

The object is also achieved by a vehicle comprising at least one fastening rail having the design described above and/or at least one roof arrangement having the design described above. The vehicle may, in particular, be a land vehicle, preferably a motor vehicle. The vehicle may also have the properties and advantages already described above in an at least similar manner. The vehicle may also be further developed in an at least similar manner within the meaning of the above description.

The object is also achieved by a method for fastening a fastening rail to a roof structure of a vehicle, in which a rear connector of the fastening rail is inserted into a receiver or insertion opening which is provided in the roof structure of a vehicle. Subsequently, the fastening rail is secured by a bayonet-type displacement movement toward a secured position on the roof structure. The fastening rail may, in particular, be a fastening rail of the type described above. The roof structure of the vehicle may, in particular, be a roof structure and/or a roof arrangement within the meaning described above. The method may also have the advantages and properties already described above in an at least similar manner. A development within the meaning of the above description is also possible in an at least similar manner.

In particular, it is possible that the method is carried out such that in a further method step, the fastening rail is fixed by a lock in its secured position. As a result, a particularly fixed and stable connection may be produced which, in particular, is not able to be inadvertently released.

BRIEF DESCRIPTION OF THE DRAWING FIGURES

Further properties and advantageous embodiments of the fastening rail, roof arrangement, motor vehicle and method are disclosed in the claims and the following description of the figures, in which:

In the various figures, the same parts are always provided with the same reference numerals, which is why generally these parts are only described once.

DETAILED DESCRIPTION

Figure 1:
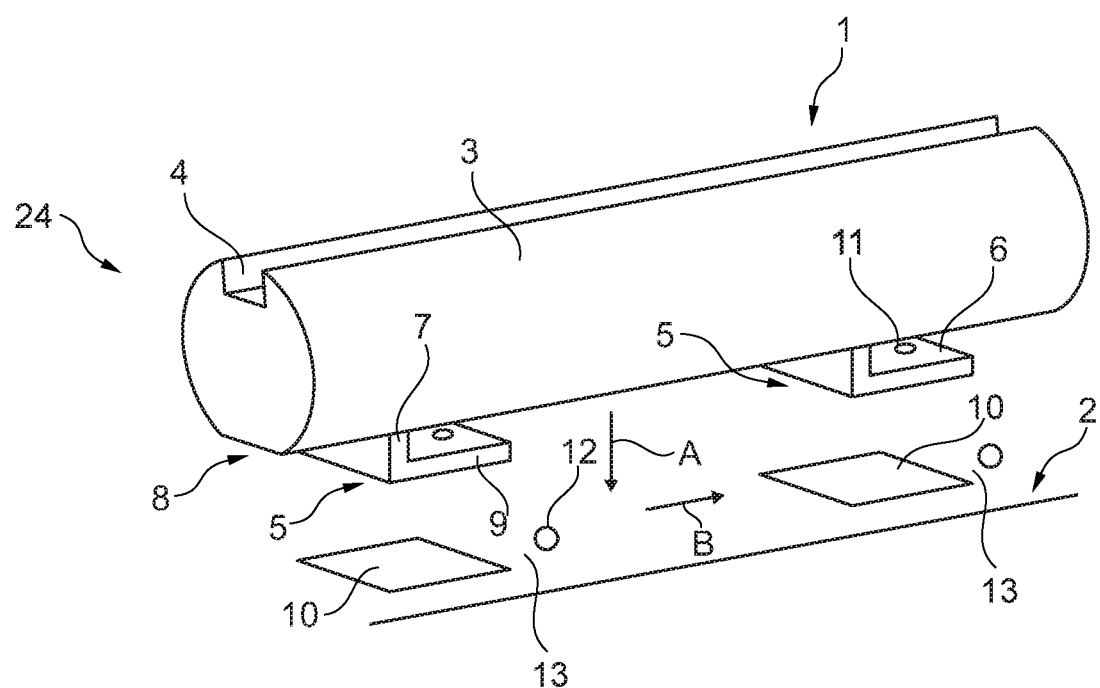
FIG. 1 shows an arrangement of a fastening rail and a motor vehicle roof suitably prepared therefor, in a schematic perspective view.

FIG. 1 illustrates a fastening rail 1 for a roof rack and a motor vehicle roof 2, consisting of both the design of the arrangement and the manner of carrying out the assembly of the fastening rail 1 on the motor vehicle roof 2.

The fastening rail 1 has a rail base body 3 which—as is usual in the prior art—extends over a large part of the length of a motor vehicle roof 2. The alignment of the fastening rail 1 is such that the longitudinal axis of the fastening rail 1 substantially coincides with the longitudinal axis of the motor vehicle. Typically, two fastening rails 1 are used, wherein in each case these fastening rails are arranged in a lateral region of the motor vehicle roof 2. The cross section of the rail base body 3 is approximately the same substantially over its entire length. The cross section in this case is an assembly region 24 selected such that it may serve as a basis for anchoring commercially available roof racks. To this end, for example, a suitable clamping groove 4 is provided in the upper region of the rail base body 3.

Whilst the roof rack (not shown in the present case) is assembled only temporarily on the motor vehicle, the fastening rails 1 typically remain permanently on the motor vehicle. In other words, the fastening rails 1 are assembled in the motor vehicle factory and—apart from optionally required repairs or an optionally required replacement—remain over the lifetime of the motor vehicle permanently on the motor vehicle.

The present fastening rail 1 has on its lower face 8 (facing the motor vehicle roof 2) a plurality of fastening regions 5 (in FIG. 1 for reasons of clarity, only two fastening regions 5 are illustrated). The fastening regions 5 serve for fastening the fastening rail 1 to the motor vehicle roof 2.

In each case, a substantially L-shaped rear connector 6 is integrally formed in the region of the fastening regions 5. The rear connector 6 has a support leg or spacer limb 7 (a type of support pillar) which protrudes substantially vertically from the lower face 8 of the fastening rail 1. A retaining leg or rear engagement surface 9 (which naturally has a finite thickness and thus also could be denoted as a rear engagement plate or the like) is provided approximately at right angles from the spacer limb 7.

According to the size, position and alignment of the rear engagement surfaces 9 of the individual rear connectors 6, a corresponding number of insertion openings or receivers 10 is provided in the motor vehicle roof 2.

It is identified further in FIG. 1 that bore holes 11, 12 are respectively arranged in a suitable position both in the rear engagement surfaces 9 and in the motor vehicle roof 2, so that the fastening rail 1 may be fixed in its secured position after (pre)assembly has been carried out. Possible exemplary embodiments of the fixing are shown in FIG. 2, wherein in the case of at least some of the fixing variants which are shown in FIG. 2, certain adaptations of the fastening regions 5 of the fastening rail 1 are optionally required.

For the assembly of the fastening rail 1, said fastening rail is retained with its fastening regions 5 in the correct position relative to the insertion openings 10 in the motor vehicle roof 2. Subsequently, a vertical insertion movement A (indicated by an arrow A) takes place, in which the rear engagement means 6 are inserted into the corresponding insertion openings 10. Subsequently, a horizontal displacement movement B (indicated by an arrow B) takes place, in which the fastening rail 1 is displaced sufficiently far relative to the motor vehicle roof 2 that the rear engagement surfaces 9 of the rear engagement means 6 come to bear substantially fully behind the roof plate 13 of the motor vehicle roof 2. This also has the result, amongst other things, that the spacer limbs 7 of the rear engagement means 6 at least approximately come into contact with a corresponding edge region of the insertion openings 10 in the roof plate 13 (which in particular is also visible in FIG. 2). The terms "vertical" and "horizontal" refer in this case to a substantially parallel alignment of the roof plate 13 of the motor vehicle relative to the ground. For the sake of completeness, reference is made to the fact that this condition is not necessarily provided in motor vehicle construction and the corresponding movements have to be accordingly "rethought".

In FIG. 2, in each case in a schematic cross-sectional view a possibility for fixing the fastening rail 1 to the motor vehicle roof 2 in its assembled position (secured position) is shown in different views 2A, 2B, 2C (i.e. after carrying out the two assembly movements A (vertical insertion movement) and B (horizontal displacement movement).

Figure 2A:
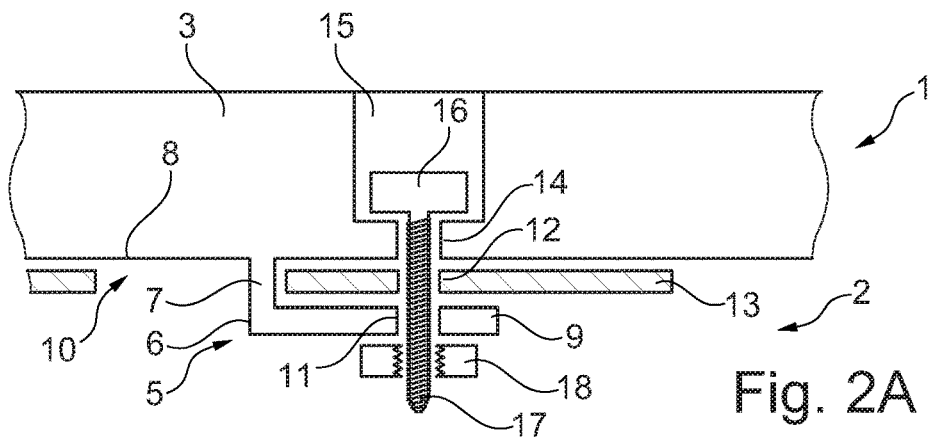
FIG. 2A is a schematic cross-sectional view illustrating a first possible embodiment for fixing a rear connector.

In FIG. 2A, a first variant of the fixing (to a certain extent a step "C") is shown. After the (pre)assembly of the fastening rail 1 to the motor vehicle roof 2 (movements A and B) fixing screws 16 are inserted in blind holes 15 which are provided in the rail base body 3 of the fastening rail 1 in the region of the fastening regions 5. In this case the threaded region 17 of the fixing screws 16 is inserted through a through-opening 14 provided in the respective blind hole 15, through the bore hole 12 respectively provided in the roof plate 13, and through the relevant bore hole 11 provided in the rear engagement surface 9. Subsequently, a nut 18 is positioned and tightened onto the protruding threaded region 17 of the fixing screws 16. This has the result that the fastening rail 1 assembled on the motor vehicle roof 2 remains permanently in position.

The nut 18 is expediently a stop nut so that the fixing screws 16/the nut 18 are effectively prevented from being shaken loose. However, other fixing options are also conceivable, such as for example washers or adhesively bonded fixing points (not shown in each case).

In the exemplary embodiment shown in the present case, the spacing between the lower face 8 of the rail base body 3 in the region of a fastening region 5 and the inner face of the rear engagement surface 9 approximately corresponds to the thickness of the roof plate 13 of the motor vehicle roof 2 (a slight additional assembly tolerance is however usually provided). By tightening the nut 18 on the fixing screw 16, due to the resilience of the material of the rear engagement means 6, in each case it results in a flat contact between the lower face 8 of the fastening rail 1 and the adjacent surface of the roof plate 13 and between the inner surface of the rear engagement surface 9 and the adjacent surface of the roof plate 13. This results in an additional mechanical fixing of the fastening rail 1 to the motor vehicle roof 2. In the exemplary embodiment shown in the present case, this has the result that both a non-positive and a positive fixing contact is provided.

It is naturally possible that in the rear engagement means 6 suitable measures are provided such that this clamping action is promoted (for example thinned material regions, hinge-like devices or the like).

Whilst in the exemplary embodiment shown in the present case (and in the exemplary embodiments shown hereinafter in FIG. 2) a substantially flat contact is produced between the lower face 8 of the rail base body 3 of the fastening rail 1 and the roof plate 13 of the motor vehicle roof 2, it is also conceivable that pillar-like spacer elements which may also be configured integrally with the fastening rail 1 are provided (partially) in the region of the fastening regions 5.

Figure 2B:
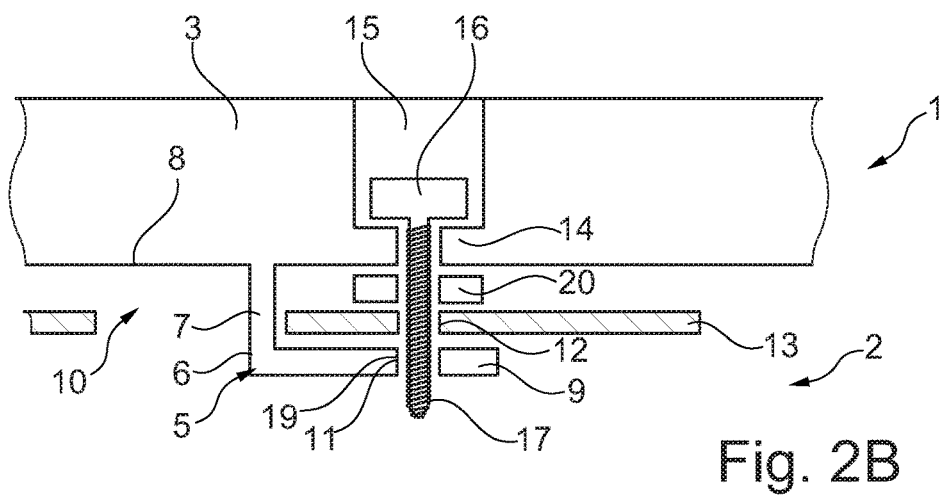
FIG. 2B is a schematic cross-sectional view illustrating a second possible embodiment for fixing a rear connector.

FIG. 2B shows a modification of the fixing shown in FIG. 2A. Firstly, in the variant shown in FIG. 2B, the bore hole 11 is provided in the rear engagement surface 9 of the rear connector 6 with an internal thread 19 which corresponds to the thread of the threaded region 17 of the fixing screws 16. As a result, it is possible to dispense with the nut 18. Moreover, in FIG. 2B a buffer washer 20 made of a slightly resilient material is provided between the roof plate 13 and the rail base body 3. Due to its force action, this buffer washer 20 may effectively prevent the fixing screws 16 from being shaken loose over time. Naturally, other suitable measures are also conceivable.

Figure 2C:
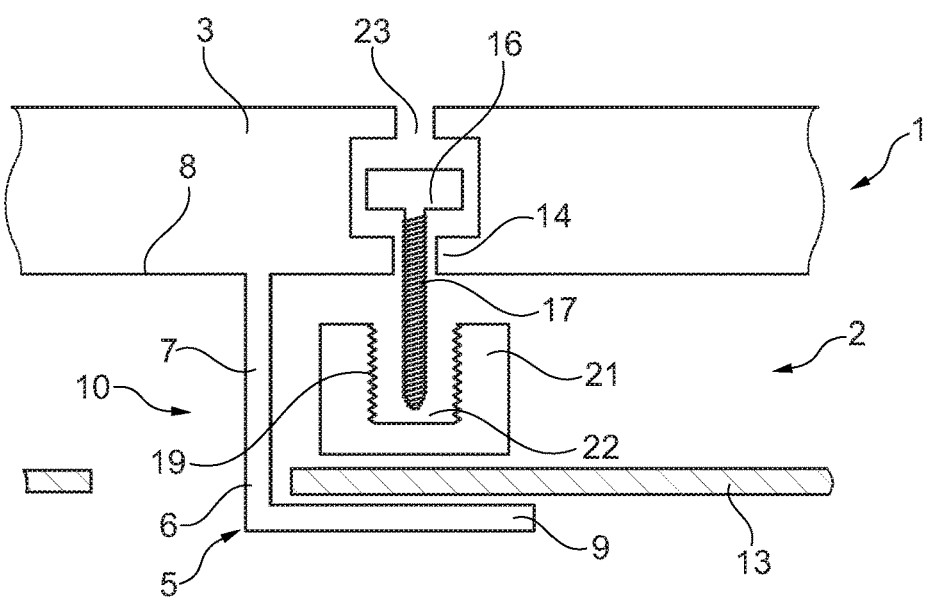
FIG. 2C is a schematic cross-sectional view illustrating a third possible embodiment for fixing a rear connector.

In FIG. 2C, a further third variant of the fixing is shown. In this variant, a bore hole 11, 12 for passing through the threaded regions 17 of the fixing screws 16 is neither required in the roof plate 13 nor in the rear engagement surface 9. Instead, a pressing body 21 is provided between the lower face 8 of the rail base body 3 and the adjacent surface of the roof plate 13. The pressing body 21 has a blind hole 22 provided with an internal thread 19. By a rotational movement of the fixing screws 16 the pressing body 21 is forced outwardly away from the rail base body 3 of the fastening rail. This results in a secure clamping seat of the roof plate 13 between the rear engagement surface 9 of the rear connector 6 and the pressing body 21. Although a positive fixing has been dispensed with, by the proposed "purely non-positive" fixing, generally sufficiently large retaining forces may be produced.

For the sake of completeness, it will be mentioned that instead of a blind hole 15 a receiver space 23 now has to be provided in the rail base body 3 of the fastening rail, due to the force ratios.

What is claimed:

1. A fastening rail for a vehicle roof that serves for assembly of a roof rack, comprising:
    an assembly region for assembly of a roof rack;
    fastening regions for fastening the fastening rail to a vehicle roof, wherein the fastening regions include a rear connector configured integrally with the fastening rail and adapted to secure the fastening rail to the vehicle roof by means of a bayonet-type displacement movement, said rear connector including a support leg connected to the fastening rail and a retaining leg depending from the support leg and oriented substantially parallel to a longitudinal axis of the fastening rail;
    a roof plate; and
    a lock engaging the retaining leg and the roof plate captured between the retaining leg and the fastening rail.

2. The fastening rail as claimed in claim 1, wherein said lock comprises screw-like devices.

3. The fastening rail as claimed in claim 1, wherein the rear connector is configured to be substantially hook-like.

4. A motor vehicle, comprising at least one fastening rail as set forth in claim 1.

5. A roof arrangement of a vehicle, comprising a roof structure having at least one fastening rail as set forth in claim 1.

6. The roof arrangement as claimed in claim 5, wherein insertion openings are provided in the roof structure for inserting the rear connector of the fastening rail and locking openings are provided for producing a positive locking of the fastening rail to the roof structure.

7. A motor vehicle, comprising the roof arrangement as set forth in claim 5.

8. A method for fastening a fastening rail to a roof structure of a vehicle, comprising:
    inserting in a first direction a rear connector of said fastening rail into a receiver provided in said roof structure;
    displacing said fastening rail by a bayonet-type displacement movement in a second direction substantially parallel to a longitudinal axis of the fastening rail; and
    engaging a lock with the rear connector and the roof structure.

9. The method of claim 8, including positioning an engagement surface on the rear connector fully behind the roof structure before engaging the lock with the rear connector and the roof.

10. An apparatus, comprising:
    a fastening rail including a rail base body and at least one hook projecting from said rail base body wherein said hook includes a support leg connected to the rail base body and a retaining leg that depends from the support leg and is oriented substantially parallel to a longitudinal axis of the fastening rail;
    a roof plate including at least one receiver wherein said at least one hook engages said at least one receiver; and
    a lock engaging the retaining leg and the roof plate wherein the roof plate is captured between the retaining leg and the fastening rail.

11. The apparatus of claim 10, wherein said roof plate is captured between said rail base body and said retaining leg.

* * * * *